US012646863B2

(12) United States Patent
Kim et al.

(10) Patent No.: US 12,646,863 B2
(45) Date of Patent: Jun. 2, 2026

(54) RF MODULE AND ANTENNA APPARATUS INCLUDING THE SAME

(71) Applicant: KMW INC., Hwaseong-si (KR)

(72) Inventors: Duk Yong Kim, Yongin-si (KR); Sung Hwan So, Hwaseong-si (KR); Jae Hong Kim, Yongin-si (KR); Bo Sung Kim, Hwaseong-si (KR); Sung Ho Jang, Yongin-si (KR); Yun Ho Lee, Osan-si (KR); Ji Hun Lee, Hwaseong-si (KR); Young Hun Kwon, Suwon-si (KR); Yong Won Seo, Daejeon (KR); Jin Sik Park, Goyang-si (KR); Hyoung Seok Yang, Hwaseong-si (KR); Bae Mook Jeong, Suwon-si (KR); Kyo Sung Ji, Hwaseong-si (KR); Chi Back Ryu, Hwaseong-si (KR)

(73) Assignee: KMW INC., Hwaseong-si (KR)

( * ) Notice: Subject to any disclaimer, the term of this patent is extended or adjusted under 35 U.S.C. 154(b) by 164 days.

(21) Appl. No.: 18/673,389

(22) Filed: May 24, 2024

(65) Prior Publication Data

US 2024/0313431 A1 Sep. 19, 2024

Related U.S. Application Data

(63) Continuation of application No. PCT/KR2022/018552, filed on Nov. 23, 2022.

(30) Foreign Application Priority Data

Nov. 25, 2021 (KR) ........................ 10-2021-0164765
Nov. 22, 2022 (KR) ........................ 10-2022-0156986

(51) Int. Cl.
*H01Q 25/00* (2006.01)
*H01Q 15/14* (2006.01)
*H01Q 1/24* (2006.01)

(52) U.S. Cl.
CPC ........... *H01Q 25/001* (2013.01); *H01Q 15/14* (2013.01); *H01Q 1/246* (2013.01)

(58) Field of Classification Search
CPC ...... H01Q 25/001; H01Q 15/14; H01Q 1/246; H01Q 1/38; H01Q 1/42; H01Q 1/02; H01Q 21/24; H01P 1/20
See application file for complete search history.

(56) References Cited

U.S. PATENT DOCUMENTS 11,888,207 B2 * 1/2024 Ji ........................... H01Q 1/422
2003/0043076 A1 3/2003 Carson et al.
(Continued)

FOREIGN PATENT DOCUMENTS

CN 110380170 A 10/2019
CN 111987410 A 11/2020
(Continued)

OTHER PUBLICATIONS

International Search Report mailed on Feb. 27, 2023 for International Application No. PCT/KR2022/018552 and its English translation.
(Continued)

*Primary Examiner* — Seokjin Kim

(57) ABSTRACT

The present invention relates to an RF module for an antenna, and an antenna apparatus comprising same. In particular, the RF module comprises: a unit RF filter body arranged on the front surface of a main board; a radiating element unit disposed on the front surface of the unit RF filter body; and a reflector panel which is formed to be wider than the area of the vertical cross-section of the unit RF filter
(Continued)

body while forming the front surface of the unit RF filter body, and grounds (GND) the radiating element unit, wherein a plurality of cavities opened outward to the left and right are respectively formed on the left and right sides of the unit RF filter body, each cavity comprises a left filter unit and a right filter unit which have a built-in resonator so as to perform different frequency filtering, and the left filter unit and the right filter unit are electrically connected to the radiating element unit by passing through the reflector panel. Accordingly, an advantage of ameliorating the overall PIM problem is provided.

16 Claims, 16 Drawing Sheets

(56) References Cited

U.S. PATENT DOCUMENTS

2020/0287260 A1* 9/2020 Kim ...................... H01P 1/2053
2020/0365960 A1* 11/2020 Kim ..................... H01R 12/714
2022/0069476 A1* 3/2022 Yoo ........................ H01Q 1/246
2023/0109083 A1* 4/2023 Kim ......................... H01Q 1/02
343/848

FOREIGN PATENT DOCUMENTS

| | | | | | |
|---|---|---|---|---|---|
| EP | 3544204 | A2 | | 9/2019 | |
| KR | 10-2017-0050437 | A | | 5/2017 | |
| KR | 20190093160 | A | * | 8/2019 | H01P 1/207 |
| KR | 10-2020-0127782 | A | | 11/2020 | |
| KR | 10-2020-0132659 | A | | 11/2020 | |
| KR | 10-2196781 | B1 | | 12/2020 | |
| WO | WO-2020231148 | A1 | * | 11/2020 | H01Q 1/52 |

OTHER PUBLICATIONS

European Search Report dated Jan. 23, 2026 from European Patent Office for Application No. 22899001.6.

* cited by examiner

RF MODULE AND ANTENNA APPARATUS INCLUDING THE SAME

TECHNICAL FIELD

The present disclosure relates to an RF module for an antenna and an antenna apparatus including the same, and more particularly, to an RF module for an antenna, an RF module assembly, and an antenna apparatus including the same, wherein a radiation element module and an RF element are fully separated from a main board, but are disposed to be exposed to an ambient air ahead thereof and which can solve a difficulty in a heat dissipation design toward on the front side thereof having a conventional radiation element.

BACKGROUND ART

A base station antenna including a relay that is used in a mobile communication system has various forms and structures. In general, the base station antenna has a structure in which multiple radiation elements are properly disposed on at least one reflection plate that stands upright in a length direction thereof.

Recently, research is actively attempted to achieve a small-sized, lightweight, and low-cost structure while satisfying high performance requirements for a multi-input & multi-output (MIMO)-based antenna. In particular, in the case of an antenna apparatus to which a radiation element having a patch type and for implementing linear polarization or circular polarization has been applied, in general, a method of plating a radiation element consisting of a dielectric board made of a plastic or ceramic material and coupling the radiating element to a printed circuit board (PCB) through soldering is widely used.

FIG. 1 is an exploded perspective view of illustrating an example of an antenna apparatus according to a conventional technology.

As illustrated in FIG. 1, in an antenna apparatus 1 according to the conventional technology, multiple radiation elements 35 are arranged on the front side of an antenna housing body 10, that is, a beam output direction, so that beams are output in a desired direction to facilitate beamforming. In order to protect the radiation elements against an external environment, a radome 50 is mounted at the front end of the antenna housing body 10 with the multiple radiation elements 35 interposed therebetween.

More specifically, the antenna apparatus 1 according to the conventional technology is provided in the form of a thin rectangular parallelepiped enclosure having a front opened, and includes the antenna housing body 10 in which multiple heat dissipation pins 11 have been integrally formed, a main board 20 that is stacked and disposed on a rear surface of the antenna housing body 10 therein, and an antenna board 30 that is stacked and disposed on a front surface of the antenna housing body 10 therein, at the rear of the enclosure.

The patch type radiation elements or dipole type radiation elements 35 may be mounted on a front surface of the antenna board 30. The radome 50 that enables radiation from the radiation elements 35 to be smoothly performed, while protecting parts therein against the outside, may be installed in front of the antenna housing body 10.

However, the example 1 of the antenna apparatus according to the conventional technology has a structure in which various digital elements (an FPGA element, etc.) and analog amplification elements (a PA element, an LNA element, etc.) are intensively mounted on the main board 20 so that heat is dissipated toward the back of the antenna housing body 10.

In this case, the LNA element, among the analog amplification elements, has problems in that it increases the density of installation distributions for the main board of other heat-generation elements and has a cause to directly degrade performance due to the generation of heat from other heat-generation elements because the LNA element has a small amount of heat generation and is also mounted on the main board 20.

Furthermore, a common antenna apparatus has a passive inter-modulation (PIM) problem. PIM is a spurious signal that is generated due to a non-linear characteristic of a passive element, and refers to a phenomenon in which the spurious signal deteriorates communication quality by reducing a signal to noise characteristic on a communication path.

The PIM characteristic within equipment of a antenna distributed system (DAS) is maintained with predetermined quality or higher upon production, but may have a PIM problem due to a passive element that is used in a distribution network up to the final antenna at the rear end of an antenna port of remote equipment in the field.

In particular, if an antenna apparatus is designed to have a structure in which internal parts, such as an antenna element, are modulated and mounted, the PIM problem becomes great compared to the integrated mounting case if the modules are not stably fixed.

DISCLOSURE

Technical Problem

The present disclosure has been intended to solve the aforementioned technical problems, and an object of the present disclosure is to provide an RF module for an antenna, which is capable of a heat distribution by separating an LNA board part on which an LNA element having a slightly small amount of heat generation, among heat-generation elements, has been mounted from a main board and coupling the LNA board part to the unit RF filter body side, and an antenna apparatus including the same.

Furthermore, another object of the present disclosure is to provide an RF module for an antenna, which can improve the productivity of a product by modulating a radiation element part, a left filter part, a right filter part, and an amplification element part so that the radiation element part, the left filter part, the right filter part, and the amplification element part can be manufactured in a module unit and assembled on at least any one of front surface, left and right sides, and upper and lower surfaces of an RF filter body, and an antenna apparatus including the same.

Furthermore, still another object of the present disclosure is to provide an antenna apparatus capable of stably fixing and supporting an RF module for an antenna which is manufactured in a modulation unit so that the PIM characteristic can be maintained.

Technical objects of the present disclosure are not limited to the aforementioned objects, and the other objects not described above may be evidently understood from the following description by those skilled in the art.

Technical Solution

An embodiment of an RF module for an antenna according to the present disclosure includes a unit RF filter body arranged on a front surface of a main board, a radiation element part disposed on a front surface of the unit RF filter body, and a reflector panel configured to form the front surface of the unit RF filter body, formed to be wider than the area of a vertical cross section of the unit RF filter body, and configured to ground (GND) the radiation element part. A left filter part and a right filter part in which multiple cavities each opened to the outside on left and right sides thereof have been formed and which each have a resonator embedded in each cavity and perform different frequency filtering are provided on left and right sides of the unit RF filter body, respectively. The left filter part and the right filter part are electrically connected to the radiation element part through the reflector panel.

In this case, a pair of pin terminal installation holes through which a third connection pin terminal configured to mediate the transfer of transmission signals and reception signal of the left filter part, the right filter part, and the radiation element part is installed may be formed in the reflector panel.

Furthermore, the radiation element part may be provided to generate one polarization, among at least two multi-polarizations.

Furthermore, the radiation element part includes a base panel disposed on a front surface of the reflector panel, a power feeding base attached to the base panel and electrically connected to the left filter part and the right filter part, and a director panel for radiation which is provided at a front end of the power feeding base.

Furthermore, the third connection pin terminal may be soldered and fixed to the base panel.

Furthermore, the RF module may further include an amplification element part including an LNA board part that is provided on any one of an upper surface and lower surface that are front and rear thickness parts of the unit RF filter body and on which at least one analog amplification element has been mounted.

Furthermore, in the amplification element part, an LNA board part may be disposed in a board installation space provided on an upper surface or a lower surface that forms a front and rear thickness part of the unit RF filter body. The LNA board part may be electrically connected to each of the cavities of the left filter part and right filter part formed on the left and right sides of the unit RF filter body.

Furthermore, a male socket part to be coupled in a socket pin coupling way with respect to the main board may be formed in the LNA board part. A penetration slit through which the male socket part of the LNA board part passes may be formed in a board installation space.

Furthermore, at least one LNA element configured to amplify a reception signal that is received via the left filter part or the right filter part from the radiation element part may be mounted on the LNA board part. At least one PA element except the LNA element may be mounted on the main board. Heat generated from the at least one PA element may be discharged to the back of an antenna housing on which the main board has been stacked.

Furthermore, a pin installation hole that penetrates through the board installation space, the cavity of the left filter part, and the cavity of the right filter part may be formed in the unit RF filter body. The LNA board part, the left filter part, and the right filter part may be electrically connected by at least one second connection pin terminal installed in each pin installation hole. The second connection pin terminal may be soldered and fixed to the LNA board part.

Furthermore, at least one input and output port for transferring transmission signals through the left filter part and the right filter part may be provided in the unit RF filter body. The main board, the left filter part, and the right filter part may be electrically connected to the at least one input and output port through a medium of the at least one first connection pin terminal.

Furthermore, the at least one first connection pin terminal may be soldered and fixed to the front surface of the main board An antenna apparatus including an RF module for an antenna according an to embodiment of the present disclosure includes an antenna housing part formed in a form of an enclosure having a front surface opened, a main board stacked and disposed to be closely attached to an inside of the antenna housing part, and multiple RF modules for an antenna, which are arranged on a front surface of the main board. The multiple RF modules for an antenna may include a unit RF filter body arranged on the front surface of the main board, a radiation element part disposed on a front surface of the unit RF filter body, and a reflector panel configured to form the front surface of the unit RF filter body, formed to be wider than the area of a vertical cross section of the unit RF filter body, and configured to ground (GND) the radiation element part. A left filter part and a right filter part in which multiple cavities each opened to the outside on left and right sides thereof have been formed and which each have a resonator embedded in each cavity and perform different frequency filtering may be provided on left and right sides of the unit RF filter body, respectively. The left filter part and the right filter part may be electrically connected to the radiation element part through the reflector panel.

In this case, the multiple RF modules for an antenna may each further include an amplification element part including an LNA board part that is provided on any one of an upper surface and lower surface that are front and rear thickness parts of the unit RF filter body and on which at least one analog amplification element has been mounted.

Furthermore, the radiation element part may include a base panel disposed on a front surface of the reflector panel. The left filter part and the right filter part may be soldered and fixed to the main board so that the left filter part and the right filter part are electrically connected to the main board through a medium of at least one first connection pin terminal. The left filter part and the right filter part may be soldered and fixed to an LNA board part so that the left filter part and the right filter part are electrically connected to the LNA board part through a medium of at least one second connection pin terminal. The left filter part and the right filter part may be soldered and fixed to the base panel so that the left filter part and the right filter part are electrically connected to the base panel through a medium of at least one third connection pin terminal.

Furthermore, the antenna apparatus may further include a fixing member having both left and right ends fixed to left and right side walls of the antenna housing part and configured to fix the unit RF filter body. The fixing member may be made of a non-conductive material.

Advantageous Effects

According to an embodiment of the RF module for an antenna and the antenna apparatus including the same according to the present disclosure, the following various effects can be achieved.

First, there is an effect in that overall heat dissipation performance can be improved because the LNA element provided on a reception signal path, which has a relatively small amount of heat generation, among heat-generation elements of the antenna apparatus, and does not affect the entire system, is disposed to be separated from the main board.

Second, there is an effect in that the productivity of a dual band filter can be improved because the left filter part and the right filter part capable of performing mutual and independent frequency filtering are provided on the left and right of the unit RF filter body, respectively.

Third, there is an effect in that a common PIM characteristic of the antenna apparatus can be maintained because the filter part, the radiation element part, and the amplification part are manufactured in one module unit and assembled, and the main board, the filter part, the amplification part, and the filter part, and the filter part and the radiation element part are electrically connected through the medium of the connection pin terminals and are provided to be soldered and fixed, and the fixing member is further provided.

Effects of the present disclosure are not limited to the aforementioned effects, and the other effects not described above may be evidently understood by those skilled in the art from the writing of the claims.

LIST OF REFERENCE NUMERALS

Figure 1:
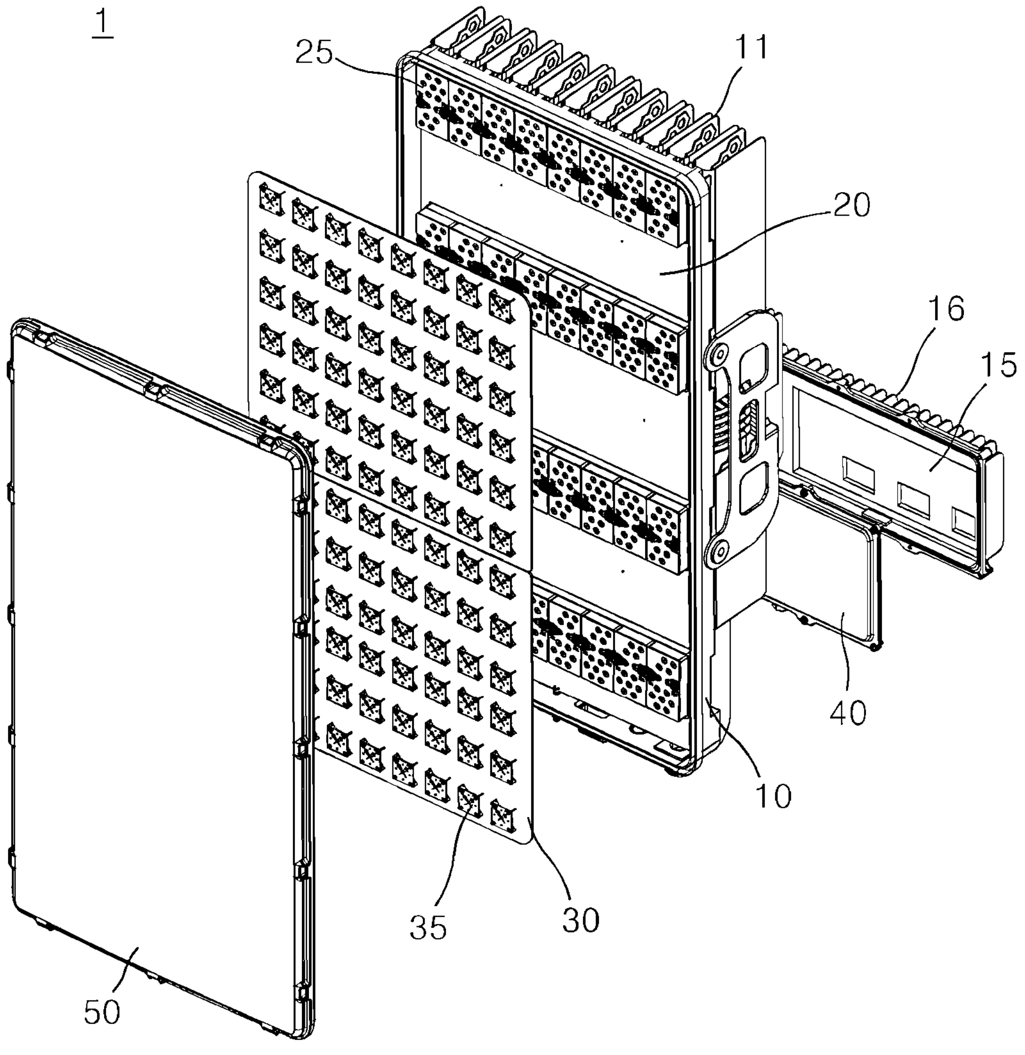
FIG. 1 is an exploded perspective view illustrating an example of an antenna apparatus according to a conventional technology.

100: antenna apparatus 110: antenna housing part
110S: internal space 111: rear heat dissipation pin
120: main board 125: female socket part
130: PSU board part 140: RFIC board part
150: surge board part 200: RF module for an antenna
210: unit RF filter body 220: radiation element part
230: amplification element part 270: reflector panel
287: input and output port

BEST MODE

Hereinafter, an RF module for an antenna and an antenna apparatus including the same according to an embodiment of the present disclosure are described in detail with reference to the accompanying drawings.

In adding reference numerals to the components of each drawing, it should be noted that the same components have the same reference numerals as much as possible even if they are displayed in different drawings. Furthermore, in describing embodiments of the present disclosure, when it is determined that a detailed description of the related well-known configuration or function hinders understanding of an embodiment of the present disclosure, the detailed description thereof will be omitted.

Furthermore, in describing components of an embodiment of the present disclosure, terms, such as a first, a second, A, B, (a), and (b), may be used. Such terms are used only to distinguish one component from another component, and the essence, order, or sequence of a corresponding component is not limited by the terms. All terms used herein, including technical or scientific terms, have the same meanings as those commonly understood by a person having ordinary knowledge in the art to which the present disclosure pertains, unless defined otherwise in the specification. Terms, such as those commonly used and defined in dictionaries, should be construed as having the same meanings as those in the context of a related technology, and are not construed as having ideal or excessively formal meanings unless explicitly defined otherwise in the specification.

Figure 2:
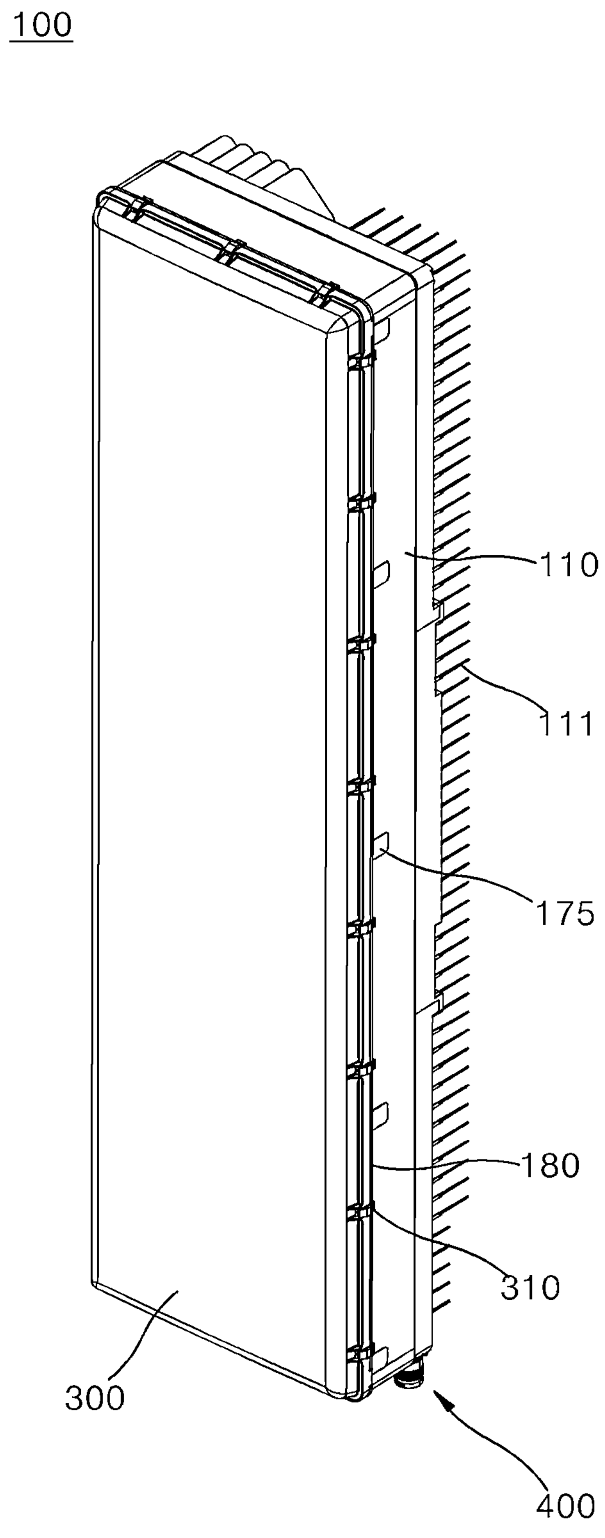
FIG. 2 is a perspective view illustrating an antenna apparatus according to an embodiment of the present disclosure.
Figure 3:
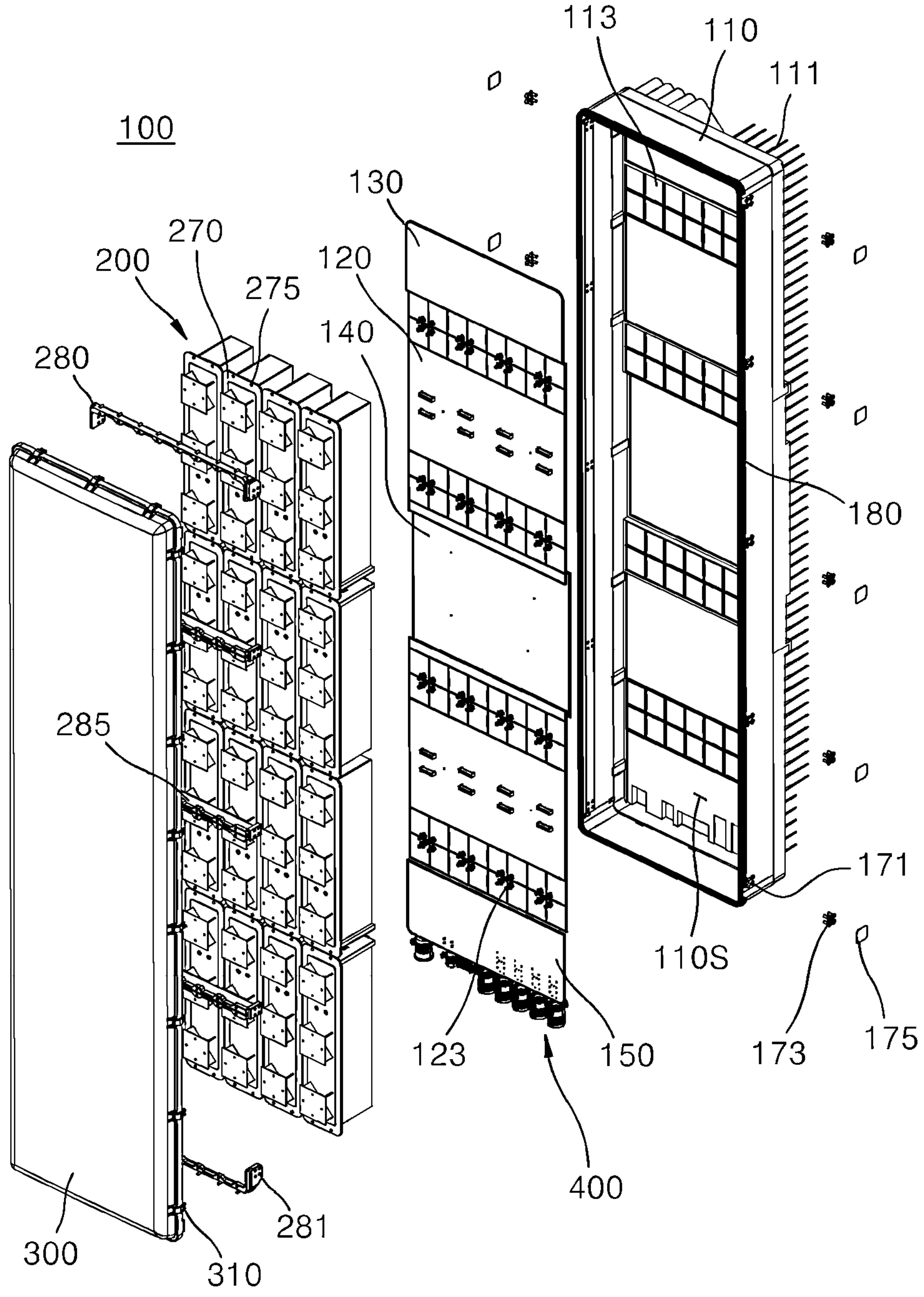
FIG. 3 is a general exploded perspective view of FIG. 2.
Figure 4:
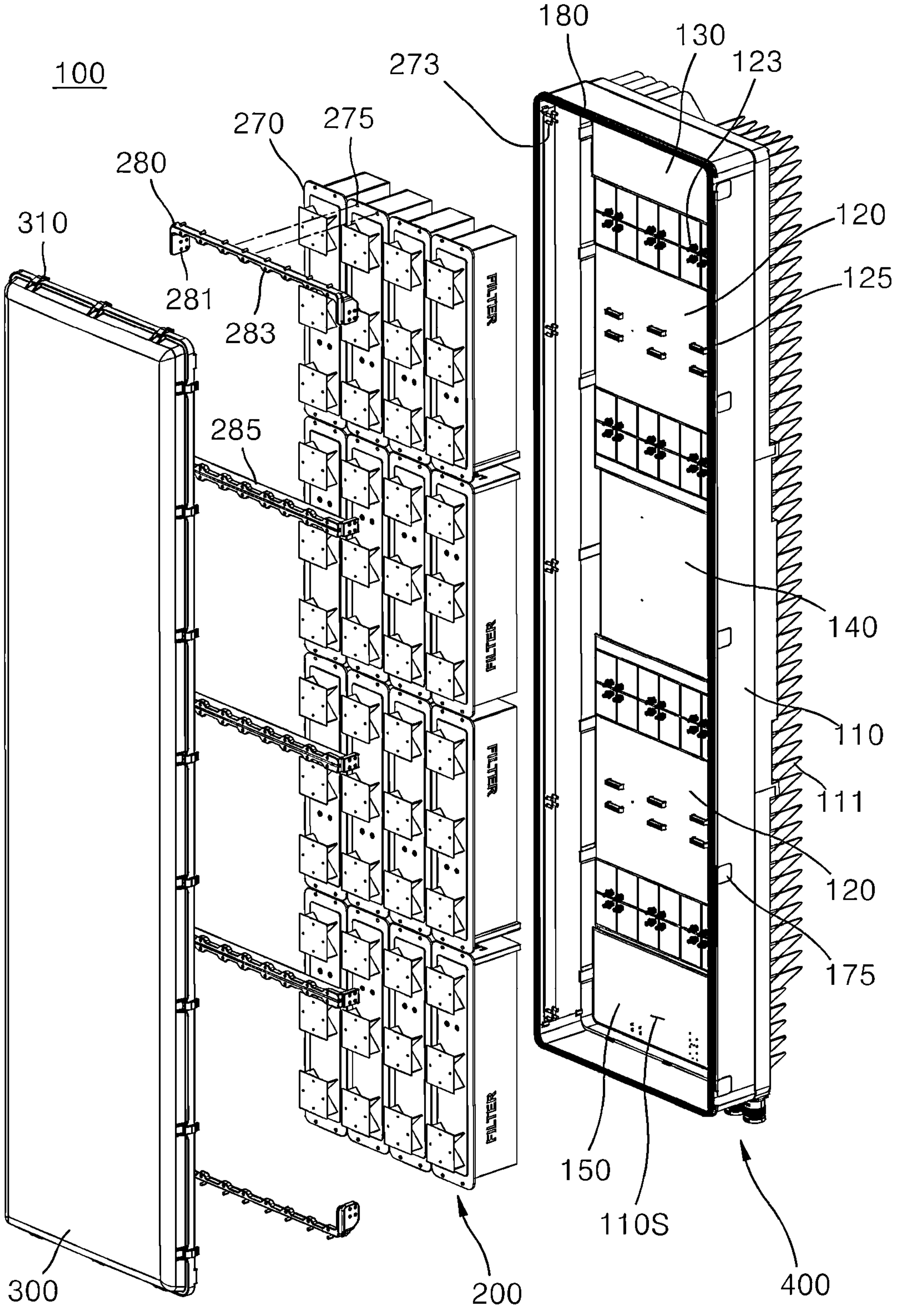
FIG. 4 is an exploded perspective view for describing a process of installing a main board of an RF module for an antenna, among components of FIG. 2.
Figure 5:
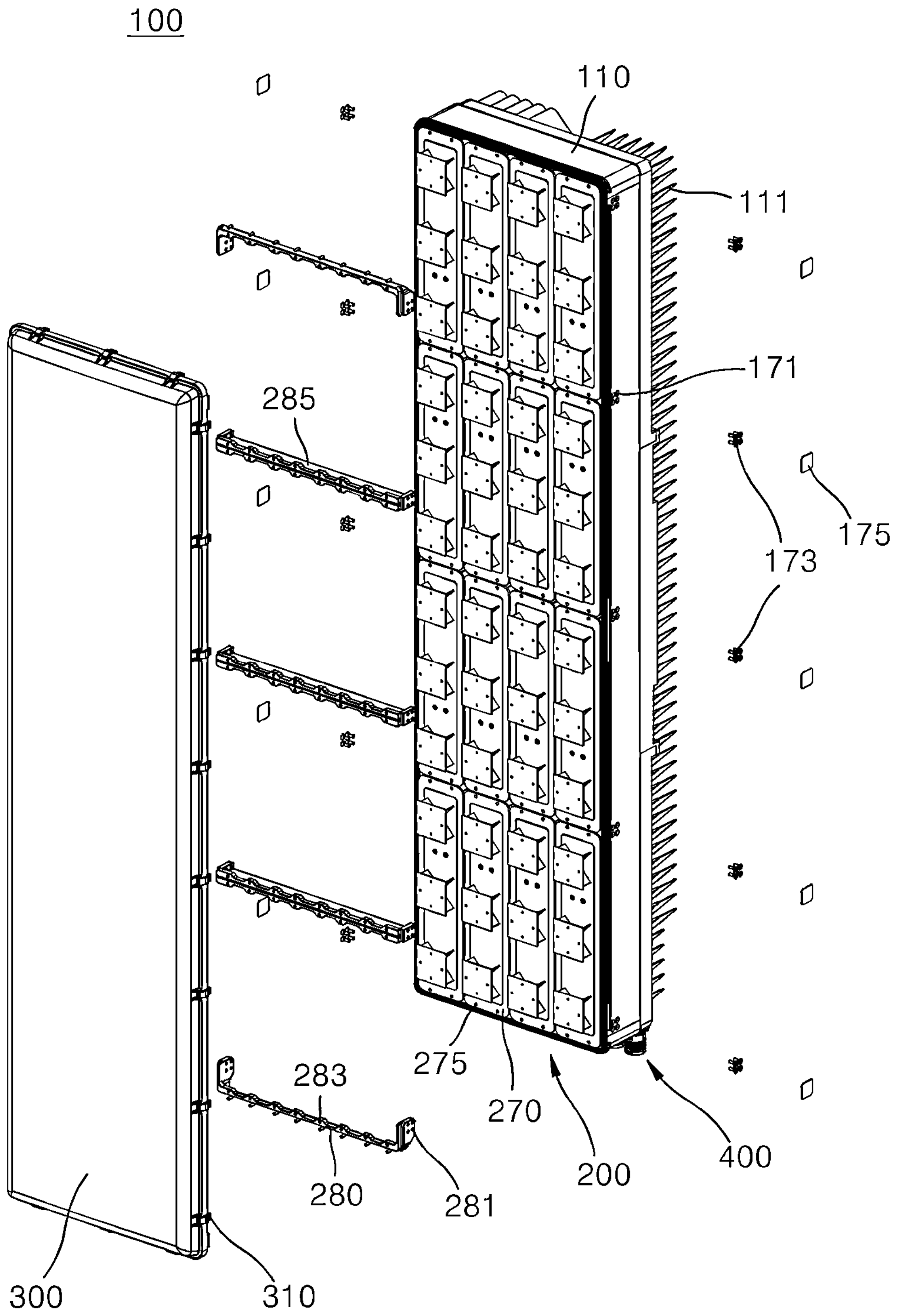
FIG. 5 is an exploded perspective view for describing a process of installing a fixing member, among the components of FIG. 2.

FIG. 2 is a perspective view illustrating an antenna apparatus according to an embodiment of the present disclosure. FIG. 3 is a general exploded perspective view of FIG. 2. FIG. 4 is an exploded perspective view for describing a process of installing a main board of an RF module for an antenna, among the components of FIG. 2. FIG. 5 is an exploded perspective view for describing a process of installing a fixing member, among the components of FIG. 2.

As referred in FIGS. 2 to 5, an antenna apparatus 100 according to an embodiment of the present disclosure includes an antenna housing part 110 that forms external appearances of left and right sides and rear side of the antenna apparatus 100, and a radome panel 300 that forms an external appearance of the front of the antenna apparatus 100, that is provided to shield an opened front surface of the antenna housing part 110, and that protects internal parts (including a main board 120 and an RF module 200 for an antenna described later) provided in an internal space 110S of the antenna housing part 110 against the outside.

Furthermore, as referred in FIGS. 2 to 5, the antenna apparatus 100 according to an embodiment of the present disclosure further includes the main board 120 closely installed in the internal space 110S of the antenna housing part 110, a PSU board part 130 disposed on an upper side of the main board 120, an RFIC board part 140 provided between the pair of main boards 120, and a surge board part 150 at a lower part of the main board 120, and may further include the radio frequency module 200 (hereinafter abbreviated as the "RF module") for an antenna that is stacked and disposed a front surface of the main board 120.

Although not illustrated, the antenna housing part 110 may play a role of mediating the coupling of a pillar pole that is provided to install the antenna apparatus 100.

The antenna housing part 110 is generally provided as a metal material having excellent thermal conductivity in order to be advantageous for heat dissipation according to thermal conduction, and may be formed in the form of a rectangular enclosure having a thickness in forward and backward directions to the extent that the front end of the RF module 200 described later can be accommodated therein.

Meanwhile, the inside of the antenna housing part 110 may be formed in a form in which the inside of the antenna housing part is matched with an external protrusion shape by a digital element (an FPGA element, etc.) mounted on a rear surface of the main board 120 and/or a PSU element mounted on a rear surface of the PSU board part 130 and surge part elements mounted on a rear surface of the surge board part 150. This is for maximizing heat dissipation performance by increasing a thermal contact area with the rear surfaces of the main board 120, the PSU board part 130, and the surge board part 150 as much as possible.

Furthermore, a female socket part 125 to which a male socket part 235 formed in an LNA board part 231 of an amplification element part 230, among components of the RF module 200 for an antenna, which are manufactured in a module unit described later, is coupled in a socket pin coupling way may be provided on the front surface of the main board 120, and a pin coupling part 123 to which first connection pin terminals 281 of a left filter part 240A and a right filter part 240B, among components of the RF module 200 for an antenna, is coupled in a terminal pin coupling way may be provided on the front surface of the main board.

Although not illustrated in the drawings, handle parts which may be held by a worker so that the worker can carry the antenna apparatus 100 according to an embodiment of the present disclosure or can easily mount a pillar pole (not illustrated) manually on the spot may be further installed on both left and right sides of the antenna housing part 110.

Furthermore, various outside mounting members 400 for a cable connection with a base station apparatus not illustrated and the tuning of internal parts may be assembled with the outside of the bottom of the antenna housing part 110 through the antenna housing part. The outside mounting members 400 are provided in the form of at least one optical cable connection terminal (socket). Connection terminals of coaxial cables (not illustrated) may be mutually connected to connection terminals of the outside mounting members, respectively.

Referring to FIGS. 2 to 5, multiple rear heat dissipation pins 111 may be integrally formed on a rear surface of the antenna housing part 110 so that the multiple rear heat dissipation pins have a predetermined pattern shape. However, the multiple rear heat dissipation pins 111 do not need to be essentially integrally formed on the rear surface of the antenna housing part 110. It may said to be natural that the multiple rear heat dissipation pins may be manufactured as individual parts and may be coupled to the rear surface of the antenna housing part 110 in various coupling ways including a laser welding method.

In this case, heat that is generated from each of heat-generation elements of the main board 120, the PSU board 130, the RFIC board part 140, and the surge board part 150 installed in the internal space 110S of the antenna housing part 110 may be directly discharged backward through the multiple rear heat dissipation pins 111.

As referred in FIGS. 2 to 5, the multiple rear heat dissipation pins 111 are upward slantly disposed toward a left end and a right end thereof on the basis of an upper and lower portion that connects the middle of a left and right width thereof, and may be designed so that pieces of heat that are discharged to the back of the antenna housing part 110 form an upcurrent distributed in the horizontal direction and are distributed more rapidly. However, a shape of the multiple rear heat dissipation pins 111 is not essentially limited thereto. For example, although not illustrated in the drawings, if a blower fan module (not illustrated) is further provided on the rear surface side of the antenna housing part 110 in order to make smooth a flow of an ambient air, the multiple rear heat dissipation pins 111 may be adopted so that the multiple rear heat dissipation pins are formed in parallel at the left end and the right end in the blower fan module that is disposed at the center thereof in order for discharged heat to be discharged more rapidly by the blower fan module.

Meanwhile, the radome panel 300 is coupled to a front end of the antenna housing part 110, but a hook coupling part 310 that is formed along the edge of the radome panel 300 may be hook-coupled to the front locking rib (a reference numeral not indicated) side of the antenna housing part 110.

In this case, a waterproof gasket ring 180 made of a rubber material may be interposed between the edge of the front end of the antenna housing part 110 and the radome panel 300. The waterproof gasket ring 180 may perform a sealing function while being elastically deformed by a coupling force that is provided upon hook-coupling with the antenna housing part 110 of the radome panel 300.

Meanwhile, as referred in FIGS. 3 to 5, the antenna apparatus 100 according to an embodiment of the present disclosure may further include fixing members 280 for fixing a unit RF filter body 210 of each RF module 200 upon installation of the RF module 200 for an antenna.

As referred in FIG. 5, the fixing member 280 may be fixed as both left and right ends of the fixing member are disposed within multiple left and right penetration holes 171 provided to penetrate left and right side walls of the antenna housing part 110 and multiple assembly screws 173 are fastened to screw fastening holes 281 formed at both left and right ends of the fixing member through the multiple left and right penetration holes 171 from the outside.

The multiple left and right penetration holes 171 formed in the antenna housing part 110 and the multiple assembly screws 173 fastened to the multiple left and right penetration holes may have a danger of damaging a fine sight due to exposure to the outside. Accordingly, as referred in FIGS. 2 to 5, each of the multiple left and right penetration holes 171 may be shielded from the outside by attaching a separate shielding film 175 thereto.

Furthermore, multiple module fixing screw holes 283 may be formed in the fixing member 280 so that the multiple module fixing screw holes are horizontally spaced apart from each other. Multiple assembly screws (not illustrated) may be fastened to module fixing screw fastening holes 275 formed in a reflector panel 270, among components of the RF module 200 assembled in the internal space 110S of the antenna housing part 110. Accordingly, each RF module 200 can be stably fixed.

As multiband operation base stations having increased frequency bands are recently increased, a passive intermodulation (PIM) phenomenon is recognized as a very big problem by a communication service provider.

The PIM phenomenon is a phenomenon that occurs due to a kind of radio wave interference, and major causes thereof include radio waves of several frequencies and rusty metal, in general. However, the PIM phenomenon is not a problem that essentially occurs by the two factors only. For example, as the antenna housing part 110 is lengthily formed vertically due to the application of the multi-input & multi-output (MIMO) technology, the non-linearity (an error of a metal contact point) of contraction resistance that is generated between electrical connection elements due to a fine twist attributable to the skewed and concentrated heat generation of heat-generation elements that operate for an operation of the antenna housing part may become a cause of the PIM problem.

In this case, it is preferred that a non-conductive material (e.g., a plastic resin-based material) is adopted as the fixing member 280 so that the PIM influence is minimized and the influence of the reflector panel 270 described later on a ground (GND) role is minimized. It is preferred that a plastic resin-based material is also adopted as the multiple assembly screws (not illustrated).

Furthermore, the antenna apparatus 100 according to embodiment of the present disclosure, although not an illustrated in the drawings, may further include a buffering part made of a silicon rubber material, which is attached to a front end of the fixing member 280. The buffering part may play a role of reducing an internal impact between parts by being seated and installed in the fixing member 280 that fixes each unit RF filter body 210.

It is difficult to maintain the PIM characteristic in that each RF module is modulated and manufactured as described above and a coupling force between the main board 110 and each RF module 200 depends on a very weak coupling force between the male socket part 235 of the LNA board part 231 and the first connection pin terminals 281 of the RF filter body part 210 as described later. Accordingly, the PIM problem may be solved by using the fixing member 280 that firmly fixes and supports each RF module 200. This is described later while describing each component of the RF module 200 in detail.

Figure 6A:
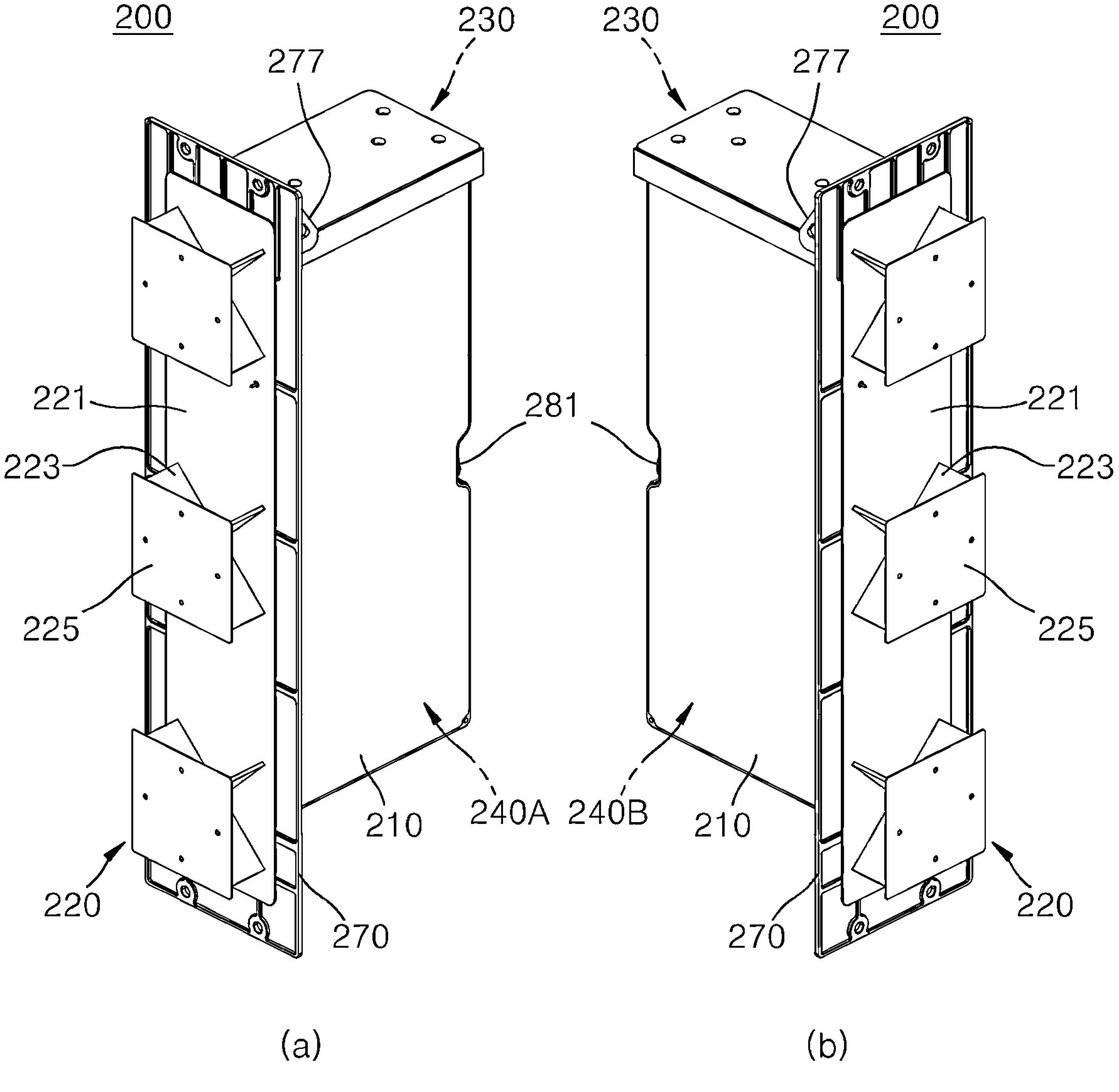
FIGS. 6A and 6B are perspective views illustrating a front part and rear part of the RF module for an antenna, among the components of FIG. 2.
Figure 6B:
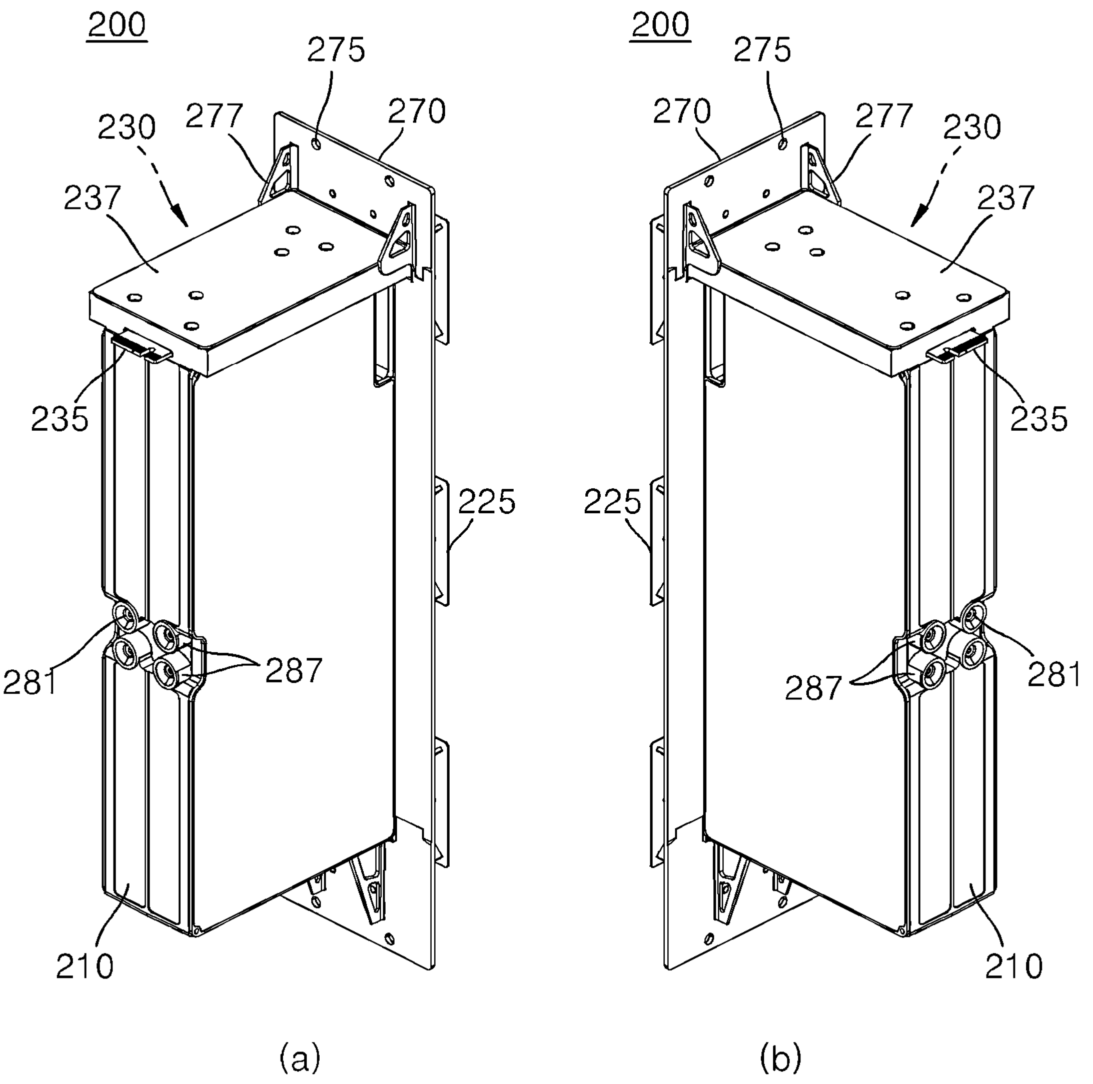

FIGS. 6A and 6B are perspective views illustrating a front part and rear part of the RF module for an antenna, among the components of FIG. 2. FIGS. 7A to 7D are exploded perspective views in the left direction and right direction of FIGS. 6A and 6B.

Referring to FIGS. 6A to 7D, an embodiment of the RF module 200 for an antenna according to the present disclosure may include the unit RF filter body 210 arranged on the front surface of the main board 120, a radiation element part 220 disposed on a front surface of the unit RF filter body 210, and the reflector panel 270 that forms the front surface of the unit RF filter body 210, that is formed to be wider than the area of a vertical cross section of the unit RF filter body 210, and that grounds (GND) the radiation element part 220.

In this case, multiple cavities C1 and C2 that have been opened to the outside on the left and right sides thereof are formed on the left and right sides of the unit RF filter body 210, respectively. The left filter part 240A and the right filter part 240B each having a resonator R embedded therein and performing different frequency filtering may be provided within the cavities C1 and C2, respectively. Hereinafter, the left filter part 240A and the right filter part 240B are described by defining that the left filter part and the right filter part are disposed on the left and right sides on the basis of a front direction.

Furthermore, the resonator R may be a resonator having a bar shape, but a shape thereof is not limited thereto. The resonator may also be made of various materials, such as dielectrics such as ceramic, or metal.

The left filter part 240A and the right filter part 240B may be designed as filters for a frequency band of 2.4G and a frequency band of 5G, respectively, and may implement a dual band antenna by one RF module 200.

Meanwhile, the radiation element part 220 may be provided to generate two or more multiple polarizations. Hereinafter, the radiation element part 220 that has implemented dual polarization, among multiple polarizations, is described in detail as an example.

As referred in FIGS. 6A to 7D, the RF module may include base panels 221 each disposed on a front surface of the reflector panel 270, power feeding bases 223 attached to the base panels 221, electrically connected to the left filter part 240A and the right filter part 240B, and each intersected and arranged in an “X” shape, and director panels 225 for radiation, which are provided at a front end of the power feeding base 223. In an embodiment of the present disclosure, the power feeding base 223 has been limited to being intersected and arranged in the “X” shape with respect to the base panel 221, but the present disclosure is not essentially thereto and does not exclude the array of the power feeding base in a “▭” shape, an “H” shape, and a “+” shape.

The director panel 225 for radiation is formed in an approximately square shape. The power feeding base 223 is disposed to diagonally support each edge portion of the director panel 225 for radiation, and each feeding end thereof is extended to be disposed at a central part of each side of the director panel 225 for radiation and fed and connected. Accordingly, each power feeding base 223 may implement dual polarization by generating each polarization.

The base panels 221 may be electrically connected to mediate the transfer of transmission signals from the left filter part 240A and the right filter part 240B formed on the left and right sides of the unit RF filter body 210, respectively, and the transfer of a reception signal from the director panel 225 for radiation. An electrical connection mechanism between the base panel 221 and each of the filter parts 240A and 240B is described more specifically later.

In the RF module 200 for an antenna according to an embodiment of the present disclosure, the radiation element part 220 is limited to being described as any one of the patch type and the dipole type, but the present disclosure is not essentially limited thereto. It is to be noted that the application of an air strip type antenna is not excluded.

Meanwhile, as referred in FIGS. 6A to 7D, the RF module 200 for an antenna according to an embodiment of the present disclosure may further include the amplification element part 230 including the LNA board part 231 that is provided on any one of an upper surface and a lower surface, that is, front and rear thickness parts of the unit RF filter body 210, and on which at least one analog amplification element (not illustrated) has been mounted.

Meanwhile, as referred in FIGS. 6A to 7D, the amplification element part 230 may include the LNA board part 231 in a board installation space 230S that is provided on any one of the upper surface and the lower surface that form the front and rear thickness parts of the unit RF filter body 210.

At least one LNA element (not illustrated) having a relatively small amount of heat generation, among analog amplification elements, and playing a role of amplifying a reception signal may be mounted on the LNA board part 231.

In general, an RF module is an array of analog RF parts. For example, analog amplification elements that amplify an RF signal are mounted on the amplification element part 230. In the case of the RF module 200 according to an embodiment of the present disclosure, only LNA elements having relatively small heat generation, among analog amplification elements, have been separated from the main board 120 and designed to be included in the unit RF filter body 210. Furthermore, the left filter part 240A and the right filter part 240B are each an RF part for frequency-filtering an input RF signal into a desired frequency band. The radiation element part 220 may be defined as an RF part that plays a role of receiving and transmitting RF signals.

In this case, the LNA board part 231 may electrically connected to the cavities C1 and C2 of the left filter part 240A and the right filter part 240B that are formed on the left and right sides of the unit RF filter body 210, respectively. An electrical connection mechanism between the LNA board part 231 and each of the filter parts 240A and 240B is described more specifically later.

The board installation space 230S in which the LNA board part 231 has been installed may be shielded by using an amplification part cover panel 237. An amplification part heat sink pin (not illustrated) that discharges heat within the board installation space 230S in a thermal conduction way may be integrally formed on an outside surface of the amplification part cover panel 237. The heat that is discharged through the amplification part heat sink pin may be discharged to the outside through a lateral part of the antenna housing part 110.

An embodiment in which only the LNA elements, among multiple analog amplification elements mounted and disposed in the existing main board 120 on the side of the unit RF filter body 210, are separately separated and provided as the amplification element part 230 as described above may be defined as components that perform a great role in the improvement of the PIM problem.

That is, the reason for this is that if the LNA elements are mounted on the main board 120 along with other heat-generation elements without being separated from the main board 120, a mounting interval for multiple analog amplification elements becomes inevitably narrow and when operation heat from such multiple analog amplification elements is generated, there is a great danger of a twist phenomenon which occurs due to the thermal skew of the antenna housing part 110 that is lengthily formed vertically.

However, the amplification element part 230 does not need to be essentially included in the unit RF filter body 210. According to an embodiment, it may be said to be natural that the amplification element part 230 may not be separated from the existing main board 120 or may be implemented to be not included in the unit RF filter body 210 although the amplification element part 230 is separated.

Meanwhile, as referred in FIGS. 6A to 7D, the reflector panel 270 may be formed on the front surface of the unit RF filter body 210.

The reflector panel 270 may play a role of preventing a radio wave (beam), which is radiated by the radiation element part 220 coupled to a front end of the unit RF filter body 210, from infiltrating into the rear side thereof and serves as a ground (GND) for the radiation element part 220.

Furthermore, the module fixing screw fastening holes 275 to which the multiple assembly screws (not illustrated) for screw fixing by the fixing member 280 described with reference to FIGS. 2 to 5 are fastened may be formed at an upper end part and lower end part of the reflector panel 270.

As already described, the fixing member 280 is for supplementing a weak coupling force of the unit RF filter body 210 for the main board 120, and can improve the PIM problem attributable to a movement or spacing of the unit RF filter body 210 by stably fixing each unit RF filter body 210 in front thereof in a process of the fixing members being assembled with internal walls of the internal space 110S of the antenna housing part 110 on the left and right sides thereof.

Figure 8A:
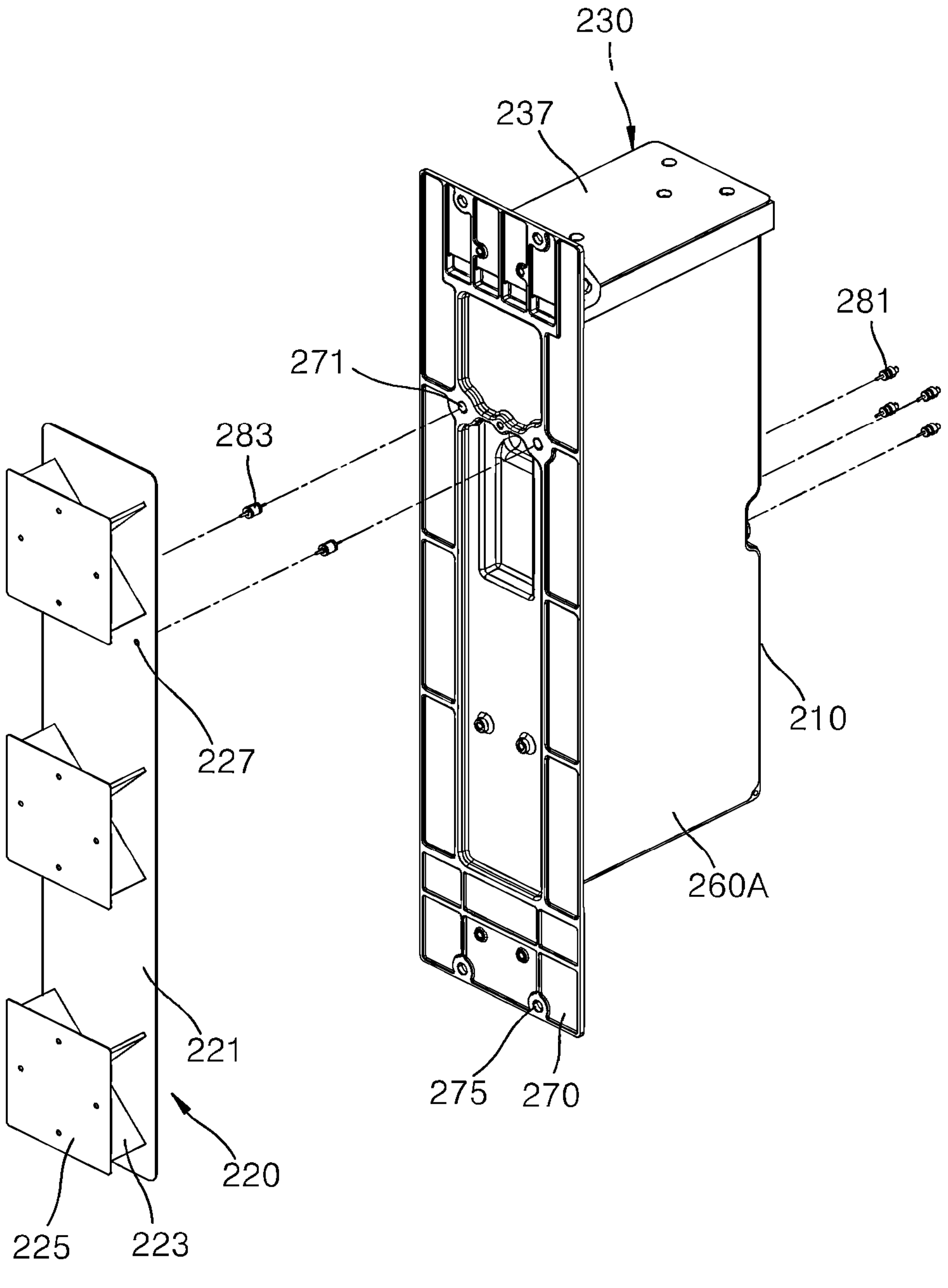
FIGS. 8A and 8B are exploded perspective views for describing a coupling relation of a radiation element part, among the components of the RF module for an antenna, with a unit RF filter body.
Figure 8B:
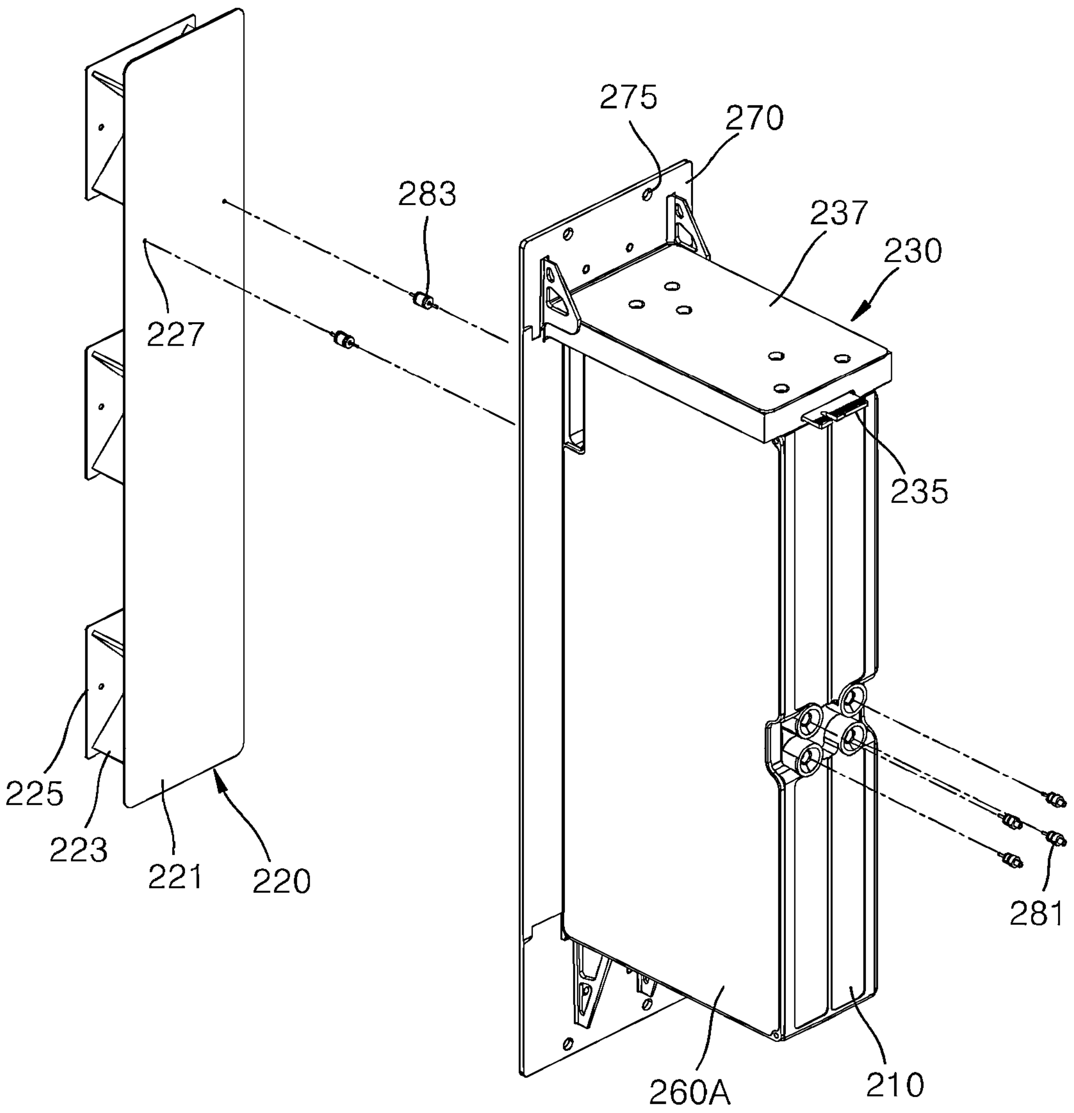
Figure 9:
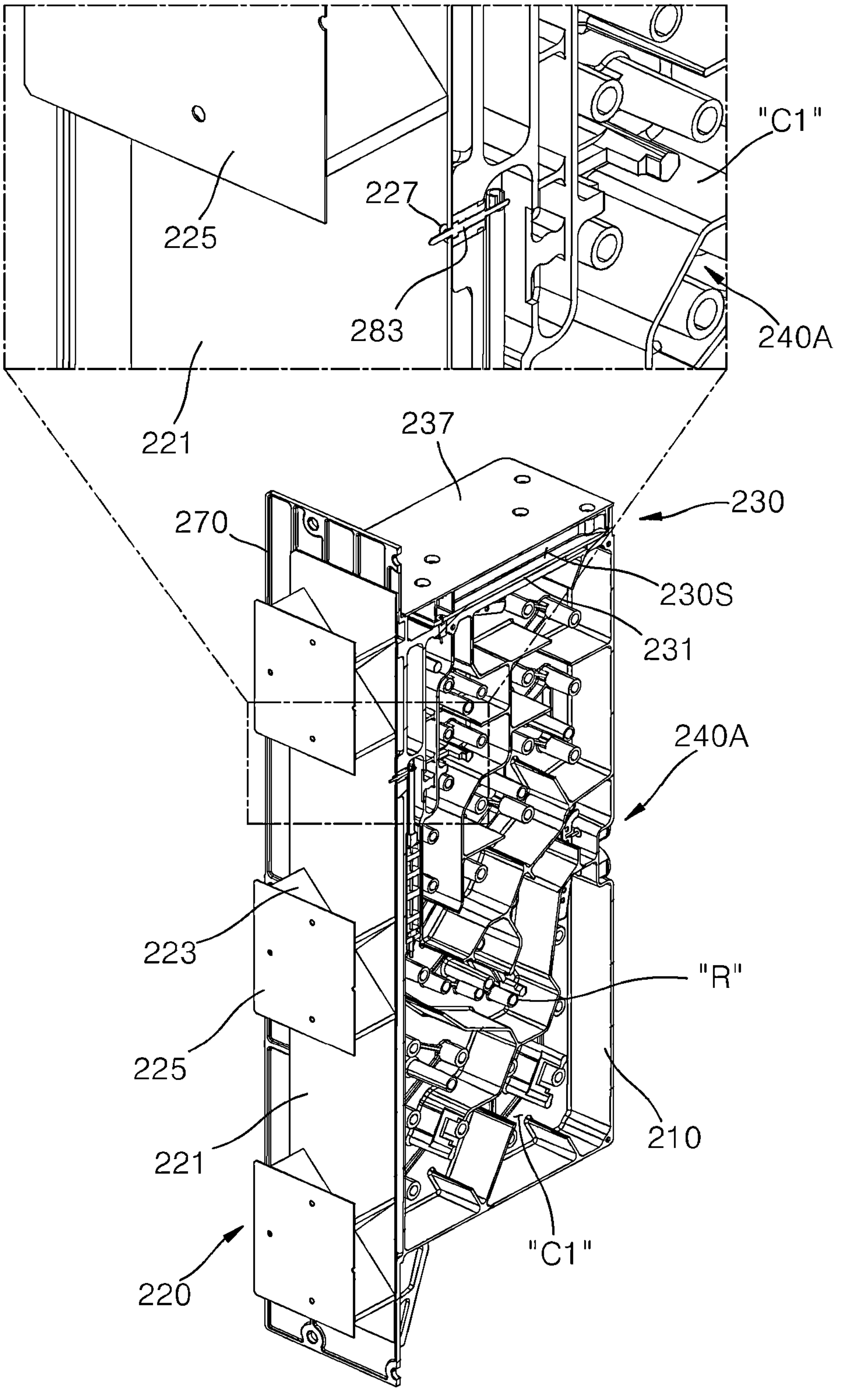
FIG. 9 is a cutaway perspective view and a partially enlarged view illustrating a form of a mutual electrical connection by a third connection pin terminal illustrated in FIGS. 8A and 8B.

FIGS. 8A and 8B are exploded perspective views for describing a coupling relation of the radiation element part, among the components of the RF module for an antenna, with the unit RF filter body. FIG. 9 is a cutaway perspective view and a partially enlarged view illustrating a form of a mutual electrical connection by a third connection pin terminal illustrated in FIGS. 8A and 8B.

As referred in FIGS. 8A and 8B, the left filter part 240A and the right filter part 240B formed on the left and right sides of the unit RF filter body 210, respectively, may be electrically connected through the medium of the at least one first connection pin terminal 281 that is included in the pin coupling part 123 provided on the front surface of the main board 120.

More specifically, at least one input and output port 287 for transferring a transmission signal through the left filter part 240A and the right filter part 240B may be provided on the rear surface side of the unit RF filter body 210.

In this case, the main board 120, the left filter part 240A, and the right filter part 240B may be electrically connected to the at least one input and output port 287 through the medium of the first connection pin terminal 281.

In this case, a rear end part of the at least one first connection pin terminal 281 may be soldered and fixed to the front surface of the main board 120 in order to improve the PIM problem.

Figure 7A:
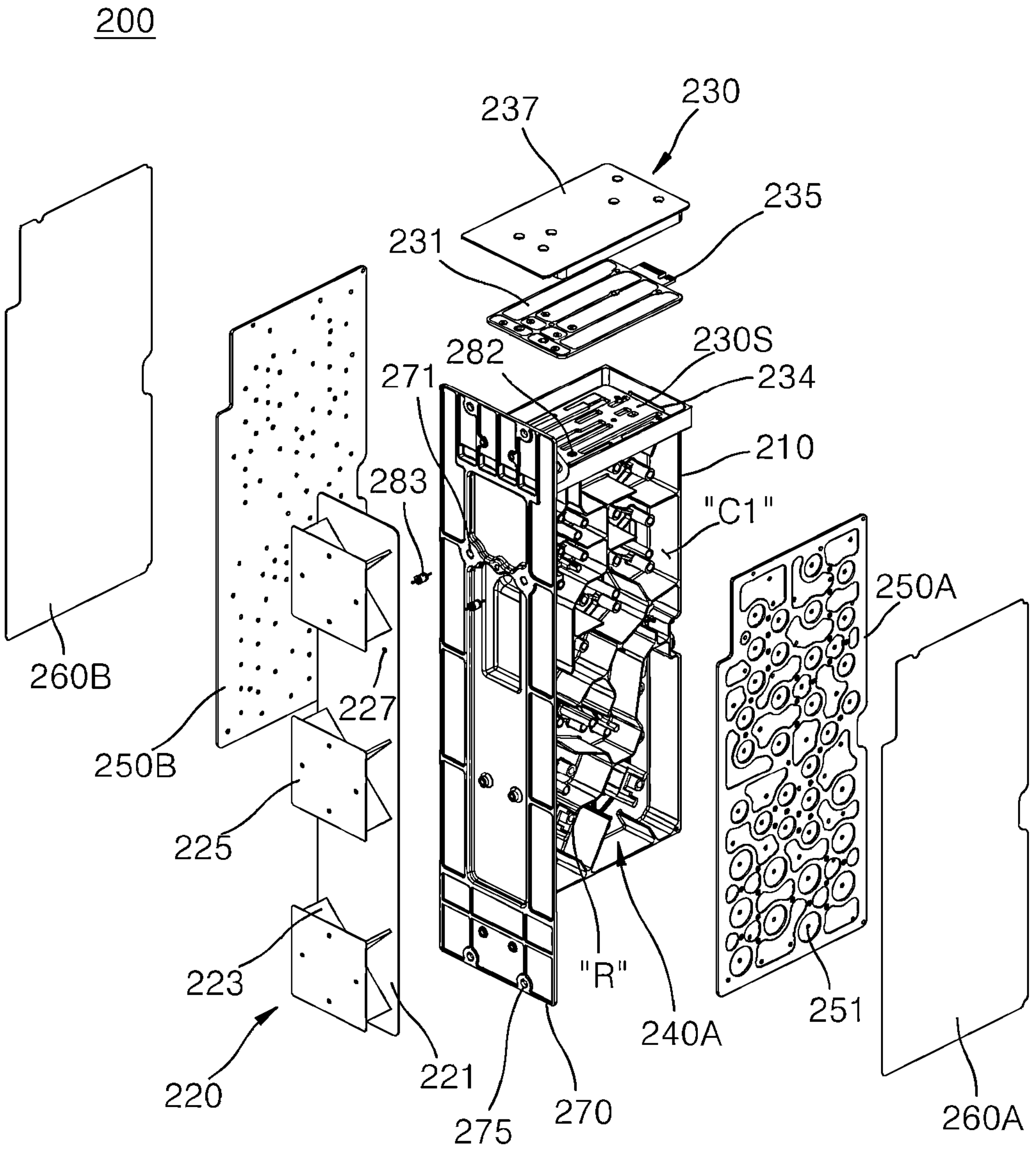
FIGS. 7A to 7D are exploded perspective views in a left direction and right direction of FIGS. 6A and 6B.
Figure 7B:
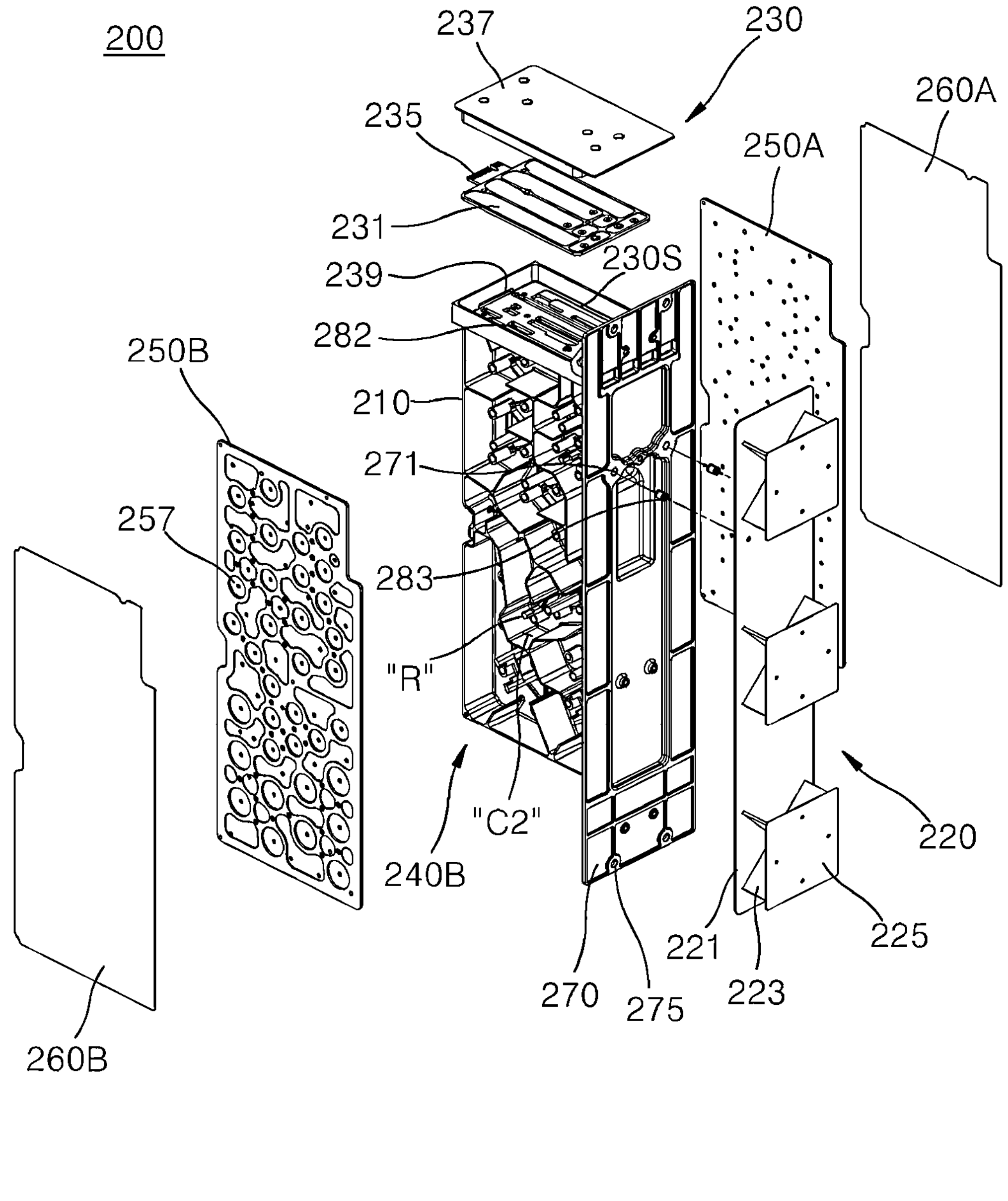
Figure 7C:
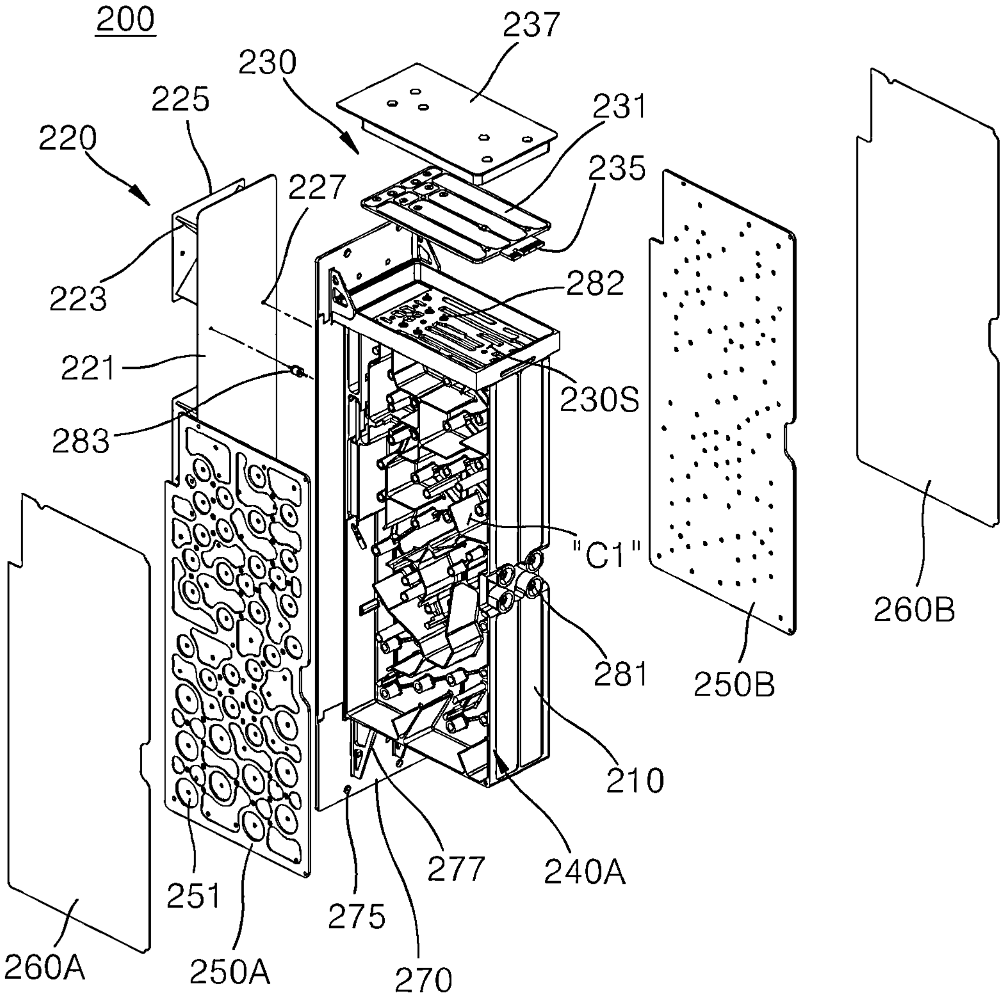
Figure 7D:
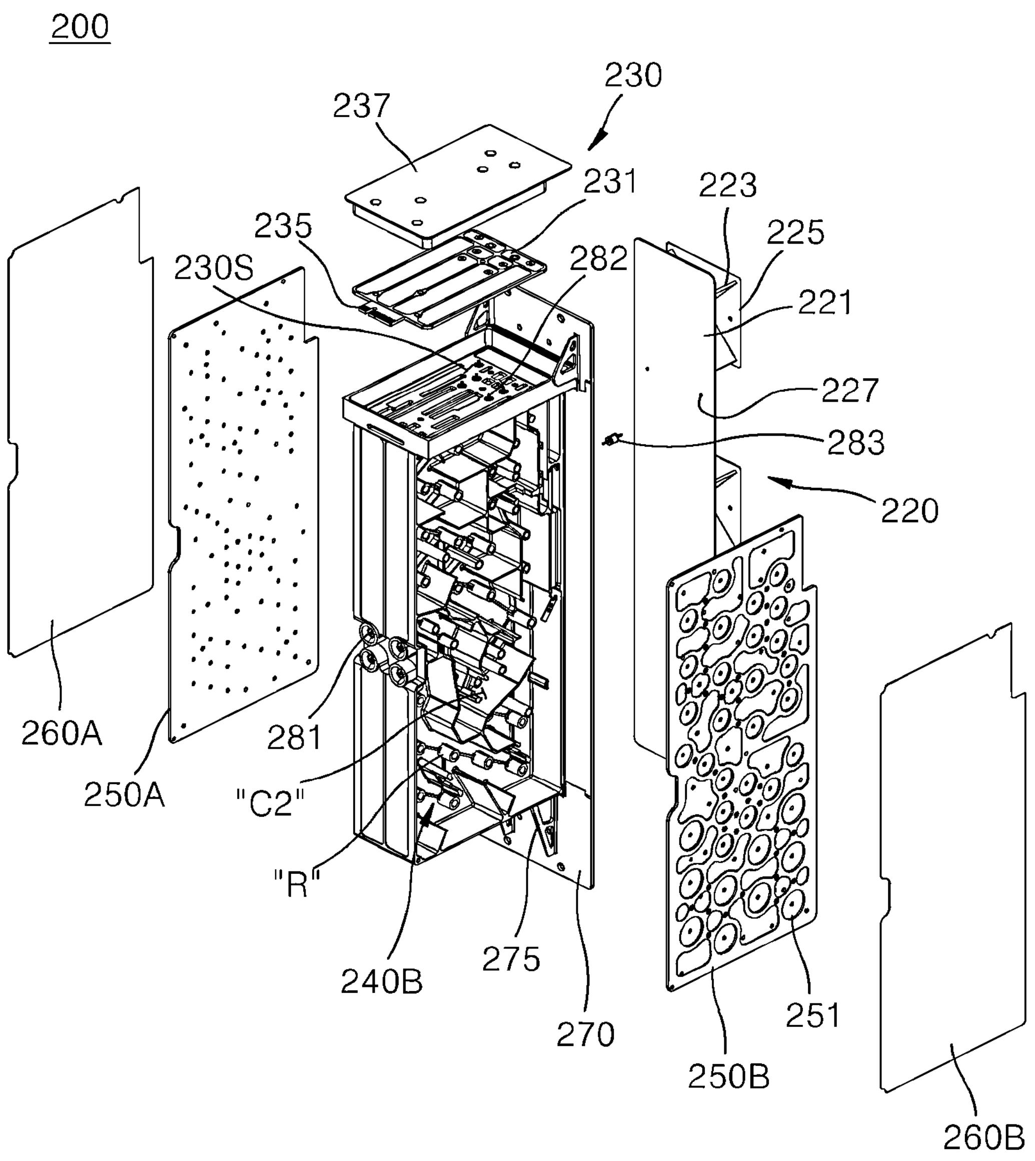

Meanwhile, referring to FIGS. 7A and 7B, the base panel 221 of the radiation element part 220 may be electrically connected by at least one third connection pin terminal 283 in order to mediate the transfer of a transmission signal from each of the left filter part 240A and the right filter part 240B and a reception signal from the director panel 225 for radiation.

In this case, the third connection pin terminal 283 may be soldered and fixed to the base panel 221 by using a coupling method, such as soldering, after being coupled in a terminal pin coupling way.

More specifically, each of the left filter part 240A and the right filter part 240B and the radiation element parts 220 in front thereof may be electrically connected through the reflector panel 270.

To this end, a pair of pin terminal installation holes 271 that are penetrated in forward and backward directions may be formed in the front surface of the unit RF filter body 210 that forms the reflector panel 270. The third connection pin terminal 283 may be penetrated and installed through the pair of pin terminal installation holes 271.

The pair of pin terminal installation holes 271 may be provided to have a number in which the pin terminal installation holes are electrically connected to the cavity C1 of the left filter part 240A and the cavity C2 of the right filter part 240B.

In particular, the at least one third connection pin terminal 283 has an advantage in that an error (the non-linearity of contraction resistance) of a metal contact point can be reduced because one end of the base panel 221 is soldered and fixed to the base panel 221 in order to improve the PIM problem.

Figure 10:
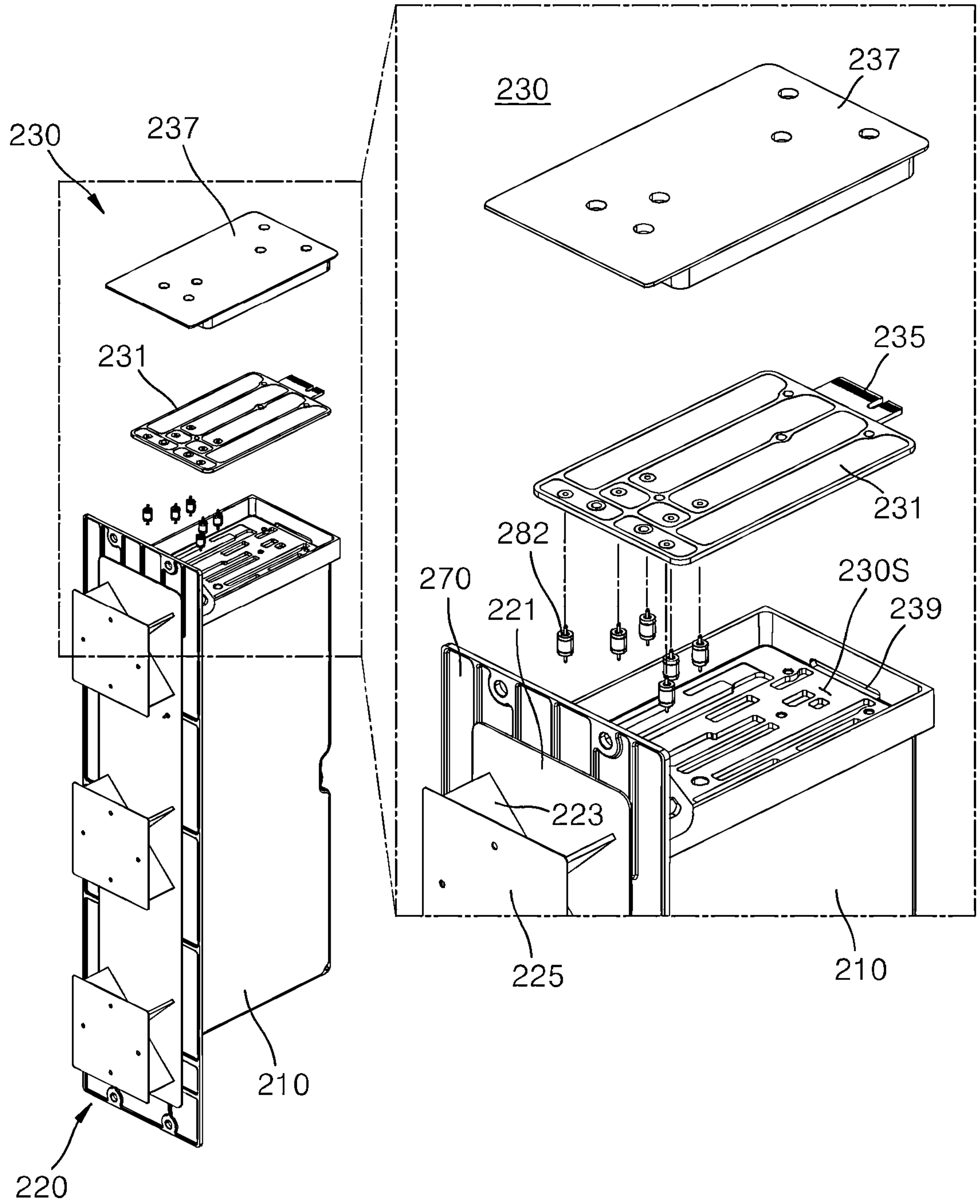
FIG. 10 is an exploded perspective view for describing a coupling relation of an amplification element part with the unit RF filter body, among the components of the RF module for an antenna.
Figure 11:
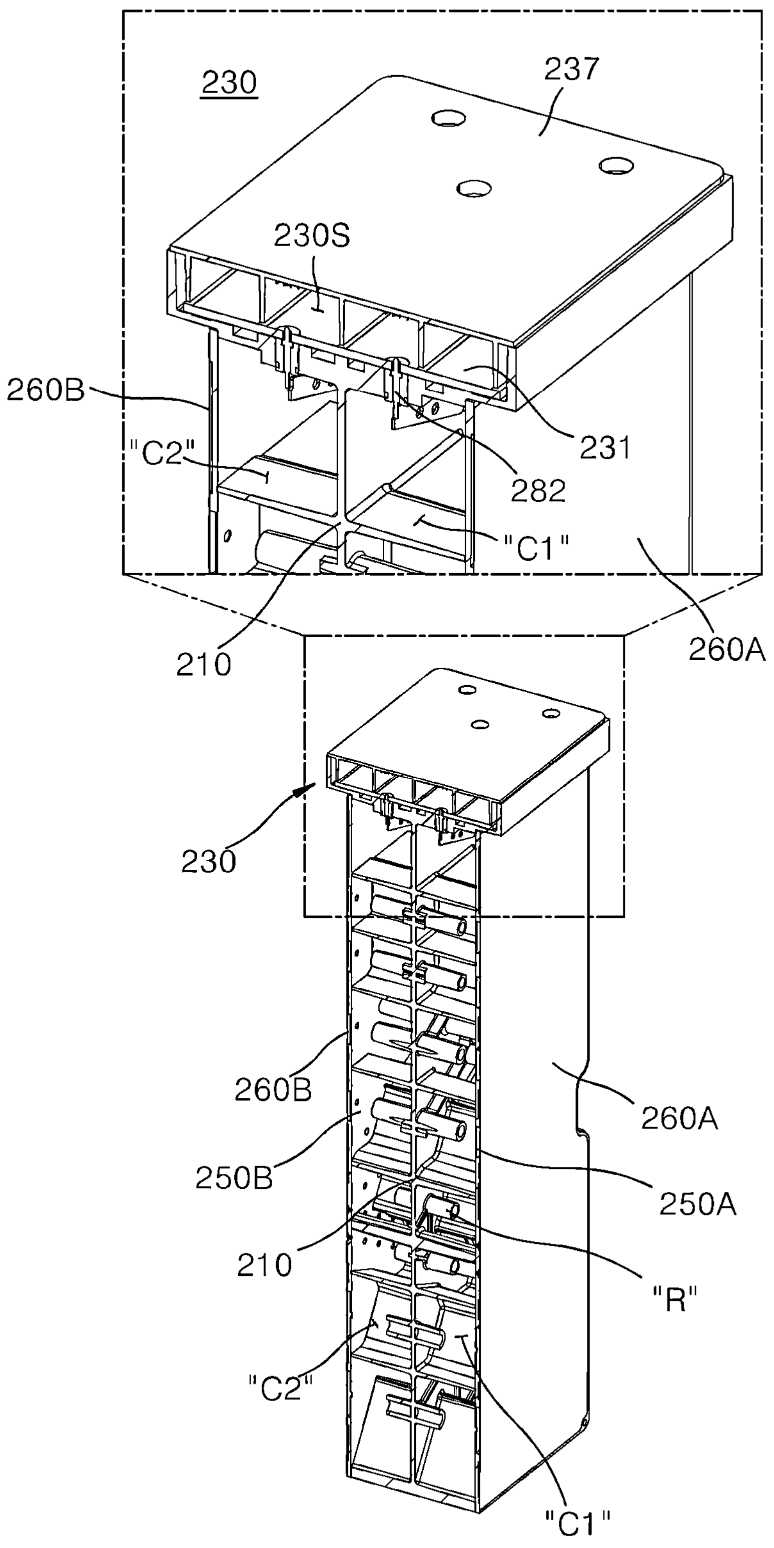
FIG. 11 is a cutaway perspective view and a partially enlarged view illustrating a form of a mutual electrical connection by a second connection pin terminal illustrated in FIG. 10.

FIG. 10 is an exploded perspective view for describing a coupling relation of an amplification element part with the unit RF filter body, among the components of the RF module for an antenna. FIG. 11 is a cutaway perspective view and a partially enlarged view illustrating a form of a mutual electrical connection by a second connection pin terminal illustrated in FIG. 10.

As referred in FIGS. 10 and 11, in the amplification element part 230, the LNA board part 231 on which at least one LNA element has been mounted may be accommodated and disposed on the board installation space 230S that is integrally formed on any one of the upper surface and lower surface of the unit RF filter body 210.

A penetration slit 239 that is penetrated toward the rear side of the unit RF filter body 210 may be formed in the board installation space 230S. The male socket part 235 formed in the LNA board part 231 may be penetrated and coupled to the female socket part 125 provided in the main board 120 in a socket pin coupling way through the penetration slit 239 so that a reception signal can be electrically connected.

In this case, only at least one LNA element that performs a function for amplifying the reception signal received via the left filter part 240A or the right filter part 240B from the radiation element part 220, among analog amplification elements, may be mounted on the LNA board part 231. At least one PA (Tx-amp) element except the LNA element mounted on the LNA board part 231 may be mounted on the main board 120.

The PA elements mounted on the main board 120 can widen an interval between heat-generation elements mounted on the main board 120 because the LNA elements are distributed, disposed, and designed on the side of the RF module 200 separated from the main board 120 in that the amount of heat generation from the PA elements is relatively much greater than that of the LNA elements. Accordingly, overall heat dissipation performance can be improved because heat generated by the heat-generation elements can be prevented from being concentrated.

Meanwhile, referring to FIGS. 10 and 11, the LNA board part 231 may be electrically connected to the cavities C1 and C2 of the left filter part 240A and the right filter part 240B formed on the left and right sides of the unit RF filter body 210, respectively, through the medium of the at least one second connection pin terminal 282.

To this end, a pin installation hole (a reference numeral not indicated) that penetrates the board installation space 230S, the cavity C1 of the left filter part 240A, and the cavity C2 of the right filter part 240B may be formed in the unit RF filter body 210.

After installed through the pin installation hole, the second connection pin terminal 282 may be soldered and fixed to the LNA board part 231 by a coupling method, such as soldering.

In this case, one end of the at least one second connection pin terminal 282, which is close to the LNA board part 231, may be soldered and fixed to the LNA board part 231 in order to improve the PIM problem.

As described above, the RF module 200 for an antenna according to an embodiment of the present disclosure has advantages in that it can maintain the PIM characteristic by improving movement and spacing problems of embedded parts, which may occur due to a weak coupling force for the main board 120 by the first connection pin terminal 281 and the male socket part 235 of the LNA board part 231, and can also maintain a stable PIM characteristic by soldering and fixing the first connection pin terminal 281, the second connection pin terminal 282, and the third connection pin terminal 283.

Meanwhile, the RF module 200 for an antenna according to an embodiment of the present disclosure may further include a left tuning cover 250A and a right tuning cover 250B coupled to cover the cavities C1 and C2 on the left and right sides of the unit RF filter body 210, respectively, and a left filter cover 260A and a right filter cover 260B that shield the left tuning cover 250A and the right tuning cover 250B.

Tuning grooves 251 may be formed in the left tuning cover 250A and the right tuning cover 250B so that precise frequency tuning is performed through the adjustment of a distance from the resonator R within each of the cavities C1 and C2.

In this case, the frequency filtering process within each of the cavities C1 and C2 of the unit RF filter body 210 needs to be performed in the state in which each cavity has been fully sealed. If the sealing is not complete or sealing performance is reduced due to an increase of a use period, there is room for the occurrence of the PIM problem.

In order to prevent the occurrence of the PIM problem, the left filter cover 260A and the right filter cover 260B including the left tuning cover 250A and the right tuning cover 250B may be attached to the unit RF filter body 210 in a laser welding way.

Meanwhile, the antenna apparatus 100 according to an embodiment of the present disclosure may be a concept that fully includes the RF module 200 for an antenna.

More specifically, as referred in FIGS. 2 to 5, the antenna apparatus 100 according to an embodiment of the present disclosure includes the antenna housing part 110 formed in the form of an enclosure having a front surface opened, the main board 120 that is stacked and disposed to be closely attached to the inside of the antenna housing part 110, and the multiple RF modules 200 for an antenna, which are arranged on the front surface of the main board 120. The multiple RF modules 200 for an antenna each include the unit RF filter body 210 arranged on the front surface of the main board 120, the radiation element part 220 disposed on the front surface of the unit RF filter body 210, the amplification element part 230 provided on any one of the upper surface and the lower surface, that is, the front and rear thickness parts of the unit RF filter body 210, and including the LNA board part 231 on which at least one analog amplification element has been mounted, and the reflector panel 270 that is formed to extend wider than the area of the front surface of the unit RF filter body 210 in a front cross section of the unit RF filter body 210 and that grounds (GND) the radiation element part 220. The multiple cavities C1 and C2 each opened to the outside on the left and right sides thereof are formed on the left and right sides of the unit RF filter body 210. The left filter part 240A and the right filter part 240B in each of which the resonator R is embedded and which each perform different frequency filtering are provided in the cavities C1 and C2, respectively.

The RF module for an antenna and the antenna apparatus including the same according to an embodiment of the present disclosure have been described in detail with reference to the accompanying drawings. However, an embodiment of the present disclosure is not essentially limited to the aforementioned embodiment, and may include various modifications and implementations within an equivalent range thereof by a person having ordinary knowledge in the art to which the present disclosure pertains. Accordingly, the true range of a right of the present disclosure will be said to be defined by the appended claims.

INDUSTRIAL APPLICABILITY

The present disclosure provides the RF module for an antenna, which is capable of a heat distribution by separating the LNA board part on which an LNA element having a slightly small amount of heat generation, among heat-generation elements, has been mounted from the main board and coupling the LNA board part to the unit RF filter body side, which can improve the productivity of a product by modulating the radiation element part, the left filter part, the right filter part, and the amplification element part so that the radiation element part, the left filter part, the right filter part, and the amplification element part can be manufactured in a module unit and assembled on at least any one of a front surface, left and right sides, and upper and lower surfaces of the RF filter body, and can stably fix and support the RF module for an antenna, which has been manufactured in a modularization unit so that the PIM characteristic can be maintained, and the antenna apparatus including the same.

The invention claimed is:

1. An RF module for an antenna comprising:
a unit RF filter body arranged on a front surface of a main board;
a radiation element part disposed on a front surface of the unit RF filter body; and
a reflector panel configured to form the front surface of the unit RF filter body, formed to be wider than an area of a vertical cross section of the unit RF filter body, and configured to ground (GND) the radiation element part,
wherein a left filter part and a right filter part in which multiple cavities each opened to an outside on left and right sides thereof have been formed and which each have a resonator embedded in each cavity and perform different frequency filtering are provided on left and right sides of the unit RF filter body, respectively, and
the left filter part and the right filter part are electrically connected to the radiation element part through the reflector panel.

2. The RF module according to claim 1, wherein a pair of pin terminal installation holes through which a third connection pin terminal configured to mediate a transfer of transmission signals and reception signal of the left filter part, the right filter part, and the radiation element part is installed is formed in the reflector panel.

3. The RF module according to claim 1, wherein the radiation element part is provided to generate one polarization, among at least two multi-polarizations.

4. The RF module according to claim 2, wherein the radiation element part comprises:
a base panel disposed on a front surface of the reflector panel;
a power feeding base attached to the base panel and electrically connected to the left filter part and the right filter part; and
a director panel for radiation which is provided at a front end of the power feeding base.

5. The RF module according to claim 4, wherein the third connection pin terminal is soldered and fixed to the base panel.

6. The RF module according to claim 1, further comprising an amplification element part comprising an LNA board part that is provided on any one of an upper surface and lower surface that are front and rear thickness parts of the unit RF filter body and on which at least one analog amplification element has been mounted.

7. The RF module according to claim 5, wherein:
in the amplification element part, an LNA board part is disposed in a board installation space provided on an upper surface or a lower surface that forms a front and rear thickness part of the unit RF filter body, and
the LNA board part is electrically connected to each of the cavities of the left filter part and right filter part formed on the left and right sides of the unit RF filter body.

8. The RF module according to claim 6, wherein:
a male socket part to be coupled in a socket pin coupling way with respect to the main board is formed in the LNA board part, and
a penetration slit through which the male socket part of the LNA board part passes is formed in a board installation space.

9. The RF module according to claim 6, wherein:
at least one LNA element configured to amplify a reception signal that is received via the left filter part or the right filter part from the radiation element part is mounted on the LNA board part,
at least one PA element except the LNA element is mounted on the main board, and
heat generated from the at least one PA element is discharged to a back of an antenna housing on which the main board has been stacked.

10. The RF module according to claim 7, wherein:
a pin installation hole that penetrates through the board installation space, the cavity of the left filter part, and the cavity of the right filter part is formed in the unit RF filter body,
the LNA board part, the left filter part, and the right filter part are electrically connected by at least one second connection pin terminal installed in each pin installation hole, and
the second connection pin terminal is soldered and fixed to the LNA board part.

11. The RF module according to claim 1, wherein:
at least one input and output port for transferring transmission signals through the left filter part and the right filter part is provided in the unit RF filter body, and
the main board, the left filter part, and the right filter part are electrically connected to the at least one input and output port through a medium of the at least one first connection pin terminal.

12. The RF module according to claim 11, wherein the at least one first connection pin terminal is soldered and fixed to the front surface of the main board.

13. An antenna apparatus comprising:
an antenna housing part formed in a form of an enclosure having a front surface opened;
a main board stacked and disposed to be closely attached to an inside of the antenna housing part; and
multiple RF modules for an antenna, which are arranged on a front surface of the main board,
wherein the multiple RF modules for an antenna comprises:
a unit RF filter body arranged on the front surface of the main board;
a radiation element part disposed on a front surface of the unit RF filter body; and
a reflector panel configured to form the front surface of the unit RF filter body, formed to be wider than an area of a vertical cross section of the unit RF filter body, and configured to ground (GND) the radiation element part,
wherein a left filter part and a right filter part in which multiple cavities each opened to an outside on left and right sides thereof have been formed and which each have a resonator embedded in each cavity and perform different frequency filtering are provided on left and right sides of the unit RF filter body, respectively, and the left filter part and the right filter part are electrically connected to the radiation element part through the reflector panel.

14. The antenna apparatus according to claim 13, wherein the multiple RF modules for an antenna each further comprise an amplification element part comprising an LNA board part that is provided on any one of an upper surface and lower surface that are front and rear thickness parts of the unit RF filter body and on which at least one analog amplification element has been mounted.

15. The antenna apparatus according to claim 14, wherein:

the radiation element part comprises a base panel disposed on a front surface of the reflector panel, the left filter part and the right filter part are soldered and fixed to the main board so that the left filter part and the right filter part are electrically connected to the main board through a medium of at least one first connection pin terminal, the left filter part and the right filter part are soldered and fixed to an LNA board part so that the left filter part and the right filter part are electrically connected to the LNA board part through a medium of at least one second connection pin terminal, and the left filter part and the right filter part are soldered and fixed to the base panel so that the left filter part and the right filter part are electrically connected to the base panel through a medium of at least one third connection pin terminal.

16. The antenna apparatus according to claim 13, further comprising a fixing member having both left and right ends fixed to left and right side walls of the antenna housing part and configured to fix the unit RF filter body, wherein the fixing member is made of a non-conductive material.

* * * * *